| United States Patent [19] | [11] Patent Number: 4,754,793 |
|---|---|
| Mohammed | [45] Date of Patent: Jul. 5, 1988 |

[54] BUTYL ELASTOMERIC COMPOSITIONS HAVING REDUCED PERMEABILITY TO GASES

[75] Inventor: Sheikh A. H. Mohammed, Sarnia, Canada

[73] Assignee: Polysar Limited, Sarnia, Canada

[21] Appl. No.: 65,568

[22] Filed: Jun. 23, 1987

[51] Int. Cl.$^4$ .......................... C08K 5/01; C08K 3/04; C08L 9/00

[52] U.S. Cl. .................................. 152/510; 524/474; 524/496; 524/525; 152/511

[58] Field of Search ...................... 524/525, 496, 474; 152/510, 511

[56] References Cited

U.S. PATENT DOCUMENTS

| 4,328,133 | 5/1982 | Ogawa et al. | |
|---|---|---|---|
| 4,396,051 | 8/1983 | Ogawa et al. | |
| 4,487,892 | 12/1984 | Ohmori et al. | |
| 4,502,520 | 3/1985 | Sandstrom | 152/510 |
| 4,591,617 | 5/1986 | Berta | 525/187 |
| 4,714,732 | 12/1987 | Hoshino | 524/525 |

*Primary Examiner*—Herbert J. Lilling
*Attorney, Agent, or Firm*—Stevens, Davis, Miller & Mosher

[57] ABSTRACT

A new rubber composition, the vulcanizate of which has reduced permeability to gases, comprises: one hundred parts by weight of at least one butyl-type rubbery polymer; from about 3 to about 20 parts by weight of α-methylstyrene homopolymer having a softening point of from about 93° C. to about 150° C. and a Tg of from about 15° C. to about 75° C.; from about 30 to about 90 parts by weight of at least one carbon black, from 0 to about 7 parts by weight of hydrocarbon extender oil; and a curing system. A process for producing said rubber composition is also provided.

24 Claims, No Drawings

BUTYL ELASTOMERIC COMPOSITIONS HAVING REDUCED PERMEABILITY TO GASES

FIELD OF THE INVENTION

This invention relates to synthetic rubber compositions and a process for producing vulcanizates thereof. More particularly, the invention relates to elastomeric compositions comprising mixtures of butyl-type elastomeric polymers and α-methylstyrene homopolymers, and a process for producing vulcanizates thereof, for use in articles requiring low or reduced permeability to gases.

BACKGROUND OF THE INVENTION

Butyl elastomeric polymers have been known and commercially available for many years. They possess a variety of inherently satisfactory properties as elastomers which has enabled them to find utility in many commercial areas. Among their satisfactory inherent properties are their impermeability to air, high damping of low frequency vibrations, and good resistance to aging, heat, acids, bases, ozones and other chemicals after vulcanization, which renders them well suited for use in a variety of applications including articles requiring low or reduced permeability to air. Examples of such articles include, but are not limited to, tire inner tubes, tire curing bladders and various air bladders.

Halogenated butyl elastomeric polymers have also been known and commercially available for many years. In addition to possessing the satisfactory inherent properties of butyl elastomeric polymers described above, halogenated butyl elastomeric polymers also possess cure compatibility with more highly unsaturated rubbers and good adhesion to such other rubbers after vulcanization, which renders them well suited for use in pneumatic tire inner liners. In the tire industry's continuing quest for improved inner liners, an elastomeric compound which exhibits both an improvement in processability and, after vulcanization, an improvement in air impermeability over conventional inner liners would be desirable, provided that these improvements also resulted in the maintenance of a high level of strength and adhesive properties.

DESCRIPTION OF PRIOR ART

U.S. Pat. No. 4,487,892 (Ohmori et al) discloses rubbery compositions for use in tire treads comprising blends of resinous polymers (1 to 30 parts by weight) having Tg of not less than 110° C. with at least one rubber (70 to 99 parts by weight) selected from the group consisting of styrene-butadiene copolymer rubber, polybutadiene rubber, butyl rubber, halogenated butyl rubber and polyisoprene rubber. The blends may be made by mastication on a mill or in an internal mixer.

U.S. Pat. No. 4,328,133 (Ogawa et al) discloses rubbery compositions which have been reinforced with organic micro fibers having Tg lower than 30° C. or higher than 120° C. and a specified average length, average diameter and ratio of the average diameter to the average length. The organic micro fibers are added in the amount 3–30 parts by weight based on 100 parts by weight of at least one rubber selected from the group consisting of natural rubber, synthetic polyisoprene rubber, butyl rubber, halogenated butyl rubber, polybutadiene rubber, styrene-butadiene copolymer rubber, ethylene-propylenediene terpolymer rubber and acrylonitrile-butadiene copolymer rubber.

U.S. Pat. No. 4,396,051 (Ogawa et al) discloses the use of various organic micro fibers described in U.S. Pat. No. 4,328,133 in the inner liner of a pneumatic tire. The rubber blend suitable for use comprises at least 50 percent by weight of butyl rubber and/or halogenated butyl rubber, and at most 50 percent by weight of a diene rubber. The authors disclose that when such a rubber blend is reinforced with organic micro fibers. vulcanized and formed into an inner liner. the result will be a pneumatic tire having low air permeability, improved fatigue resistance and low fuel consumption properties.

SUMMARY OF THE INVENTION

It is an objective of this invention to provide a new rubber composition having improved processability characteristics, which composition, after vulcanization, possesses very low permeability to gases, while also maintaining a high level of strength and adhesive properties.

It is a further objective of this invention to provide a process for producing a rubber vulcanizate having reduced permeability to gases.

It has now been found, both surprisingly and unexpectedly, that rubber compositions having improved processability characteristics and which are sulphur vulcanizable to produce tire inner liners, air bladders and similar compounds having a reduced permeability to gases, and a desirable balance of strength and adhesion properties, can be prepared by mixing together, in suitable proportions, a butyl-type rubber and α-methylstyrene homopolymer having a softening point of from about 93° C. to about 150° C. and a glass transition temperature (Tg) of from about 15° to about 75° C.

Accordingly, in one aspect, our invention provides a new rubber composition, the vulcanizate of which has reduced permeability to gases, comprising one hundred parts by weight of at least one rubbery polymer selected from the group consisting of butyl rubber, chlorinated butyl rubber and brominated butyl rubber, from about 3 to about 20 parts by weight of α-methylstyrene homopolymer having a softening point of from about 93° C. to about 150° C. and a Tg of from about 15° to about 75° C.

from about 30 to about 90 parts by weight of at least one carbon black, from 0 to about 7 parts by weight of hydrocarbon extender oil, and a curing system.

In another aspect, our invention provides a process for producing a vulcanizate having reduced permeability to gases which comprises:

(A) mixing one hundred parts by weight of at least one rubbery polymer selected from the group consisting of butyl rubber, chlorinated butyl rubber and brominated butyl rubber with an α-methylstyrene homopolymer, wherein said α-methylstyrene homopolymer is used in an amount of from about 3 to about 20 parts by weight and has a softening point of from about 93° C. to about 150° C. and a Tg of from about 15° C. to about 75° C. from about 30 to about 90 parts by weight of at least one carbon black, from 0 to about 7 parts by weight of hydrocarbon extender oil, and a curing system, (B) forming the mixture produced in (A) into a sheet, and (C) vulcanizing the sheet formed in (B) at a temperature of from about 150° C. to about 200° C. for from about 5 to about 60 minutes.

DETAILED DESCRIPTION OF THE INVENTION

Butyl rubber is well known in the art and is a polymer of a $C_4$–$C_6$ isoolefin, preferably isobutylene, and a $C_4$–$C_6$ conjugated diolefin, preferably isoprene. A preferred butyl polymer contains from about 97 to 99.5 weight percent of isobutylene and from about 0.5 to about 3 weight percent of isoprene. Butyl polymer typically has a molecular weight expressed as the Mooney (ML 1+8 at 125° C.), of from about 25 to about 65, preferably from about 40 to about 60.

Halogenated butyl polymer is well known in the art and is selected from bromobutyl or chlorobutyl polymer; it is produced by bromination or chlorination of butyl polymer. Bromobutyl polymer typically contains from about 1 to about 3, preferably from about 1 to about 2, weight percent of isoprene and from about 97 to about 99, preferably from about 98 to about 99, weight percent of isobutylene, based on the hydrocarbon content of the polymer, and from about 1 to about 4, preferably from about 1.5 to about 3, weight percent of bromine, based on the bromobutyl polymer. A typical bromobutyl polymer has a molecular weight, expressed as the Mooney viscosity (ML 1+8 at 125° C.), of from about 25 to about 55. Chlorobutyl polymer typically contains from about 1 to about 3, preferably from about 1 to about 2, weight percent of isoprene and from about 97 to about 99, preferably from about 98 to about 99, weight percent of isobutylene, based on the hydrocarbon content of the polymer, and from about 0.5 to about 2.5, preferably from about 0.75 to about 1.75, weight percent of chlorine, based on the chlorobutyl polymer. A typical chlorobutyl polymer has a molecular weight, expressed as the Mooney viscosity (ML 1+8 at 125° C.), of from about 35 to about 55.

Polymers of $\alpha$-methylstyrene are known commercially available products. One such polymer is sold under the tradename AMOCO and is available as one of Resin 18-210, Resin 18-240 or Resin 18-290. These polymers are believed to contain essentially $\alpha$-methylstyrene homopolymer and belong to a class of resins having a softening point of from about 93° C. (200° F.) to about 150° C. (300° F.) and a Tg of from about 15° to about 75° C. The resinous homopolymers are generally available as pellets which are white in colour.

The use of carbon blacks is well known in the art for reinforcement of vulcanizates and results in improved strength properties of the final vulcanizate. Suitable carbon blacks for practicing this invention are the well known furnace and channel, preferably furnace, blacks and are used in the amounts of from about 30 to about 90, preferably from about 50 to about 70, parts by weight.

The use of hydrocarbon extender oil is well known in the art; the use of such extender oils in vulcanizates generally causes the air permeability of such vulcanizates to increase. Suitable hydrocarbon extender oils include the paraffinic or naphthenic extender oils, preferably paraffinic. and are used in amounts of from 0 to about 7, preferably from 0 to about 4, parts by weight. In a most preferred embodiment, the compositions contain no hydrocarbon extender oil.

The curing system suitable for use in the present invention is not particularly restricted. A typical curing system comprises: (i) a metal oxide, (ii) elemental sulphur and (iii) at least one sulphur based accelerator. The use of metal oxides as a component in the curing system is well known in the art. A suitable metal oxide is zinc oxide. which is used in amounts of from about 1 to about 10, preferably from about 2 to about 5, parts by weight. Elemental sulphur, comprising component (ii) of said curing system is used in amounts of from about 0.2 to about 2 parts by weight. Suitable sulphur based accelerators (component (iii) of said curing system) are used in amounts of from about 0.5 to about 3 parts by weight and may be selected from the thiuram sulphides such as tetramethyl thiuram disulphide (TMTD), the thiocarbamates such as zinc dimethyl dithiocarbamate (ZDC) and the thiazyl and benzothiazyl compounds such as mercaptobenzothiazyl disulphide (MBTS). Preferably, the sulphur based accelerator is mercaptobenzothiazyl disulphide.

Stabilizers, anti-oxidants and tackifiers may also be added in the usual way and in the normal amounts for compounding butyl-type rubbery polymers.

The procedure of mixing the various components of this invention is not specifically restricted. In one embodiment, all of the ingredients of the rubber composition described above may be mechanically mixed at an initial temperature of not more than about 80° C. in an internal mixer and then vulcanized in a conventional manner. In another embodiment, the rubbery polymer and $\alpha$-methylstyrene homopolymer may be solution blended, said blend recovered from solution prior to being mechanically mixed with the remaining ingredients and then vulcanized in a conventional manner. Thus a blend of a rubbery polymer and $\alpha$-methylstyrene homopolymer is suitably achieved using solutions of the polymers in mutually compatible hydrocarbon liquid solvents. Such a blend may be recovered from solution by standard recovery techniques of solvent removal and drying, followed by the compounding and vulcanization procedure described above. In yet another embodiment, the $\alpha$-methylstyrene homopolymer may be added, in bulk, to the rubbery polymer prior to the compounding operation, such as to the rubbery polymer during a final stage of the manufacturing process thereof.

Generally, it is preferred to carry out the compounding procedure in two stages. In the first stage the polymers may be mixed with conventional compounding ingredients; these may include carbon black, hydrocarbon extender oil, tackifiers, stabilizers, processing aids and anti-oxidants. In the second stage of the compounding procedure, the cure active agents are preferably added to the compound described above on a rubber mill or in an internal mixer operated at a temperature normally not in excess of about 60° C. The cure active agents may include elemental sulphur, accelerators and zinc oxide. The compounds are cured in a conventional manner by heating for from about 5 to about 60 minutes at temperatures of from about 150° C. to about 200° C. to form elastomeric vulcanizates.

After vulcanization, the rubber compositions described above exhibit, both surprisingly and without scientific explanation, a marked improvement in air impermeability while maintaining a desirable balance of other physical properties. By an improvement in air impermeability is meant a reduction in the volume of air that passes through a unit area of defined thickness of the vulcanizate per unit of time. By physical properties is meant hardness, elongation, fatigue life, adhesion and strength properties, which include modulus at 100 percent elongation, modulus at 300 percent elongation and tensile strength at rupture. Accordingly, said vulcanizates are suitable for use in articles requiring low or reduced permeabilty to gases while maintaining a desirable balance of other physical properties.

In preferred embodiments of the present invention, a rubber composition comprises: 100 parts by weight of halogenated butyl rubber; from about 12 to about 18 parts by weight of α-methylstyrene homopolymer which has a softening point of from about 93° to about 150° C., preferably from about 110° C. to about 150° C., and a Tg of from about 15° to about 75° C., preferably from about 50° C. to about 75° C.; from about 50 to about 70 parts by weight of at least one carbon black; from 0 to about 4 parts by weight of a hydrocarbon extender oil; and a curing system. A vulcanizate derived from such a composition is suitable for use in the production of a rubber membrane material. Such a membrane material would have many uses. These may include, but are not limited to, pneumatic tire inner liners, aerosol spray can linings and air bladders used in soccer balls, footballs, basketballs, volleyballs, air mattresses and tennis balls.

In other preferred embodiments of the present invention, a rubber composition comprises: 100 parts by weight of brominated butyl rubber; from about 12 to about 18 parts by weight of α-methylstyrene homopolymer which has a softening point of from about 93° to about 150° C., most preferably from about 130° to about 150° C. and a Tg of from about 15° to about 75° C., most preferably from about 65° to about 75° C.; from about 50 to about 70 parts by weight of at least one carbon black., from 0 to about 4. most preferably 0, parts by weight of a hydrocarbon extender oil; and a curing system. Such a composition exhibits an improvement in processability characteristics, which include mill shrinkage, extrudability and green strength. Further, the vulcanizate derived from such a composition is characterized by having a marked reduction in air permeability and a marked increase in adhesion and thus, is suitable for use in a pneumatic tire inner liner application.

According to yet other preferred embodiments of the present invention a process for producing a vulcanizate having reduced permeability to gases comprises:

(A) mixing one hundred parts by weight of at least one rubbery polymer selected from the group consisting of butyl rubber, chlorinated butyl rubber and brominated butyl rubber, preferably brominated butyl rubber, with an α-methylstyrene homopolymer, wherein said α-methylstyrene homopolymer is used in an amount of from about 12 to about 18 parts by weight and has a softening point of from about 93° C. to about 150 C., more preferably from about 110° C. to about 150° C. and most preferably from about 130° C. to about 150° C., and a Tg of about 15° C. to about 75° C., more preferably from about 50° C. to about 75° C. and most preferably from about 50° C. to about 75° C., and most preferably from about 65° C. to about 75° C., from about 30 to about 90 parts by weight of at least one carbon black, from 0 to about 7 parts by weight of hydrocarbon extender oil, and a curing system, (B) forming the mixture produced in (A) into a sheet, and (C) vulcanizing the sheet formed in (B) at a temperature of from about 150° C. to about 200° C. for from about 5 to about 60 minutes.

The following examples illustrate the present invention and are not intended to limit the scope thereof. All parts are parts by weight unless otherwise specified. The materials used were:

Butyl rubber—commercial product sold as POLYSAR ® Butyl 301
Brominated butyl rubber—commercial product sold as POLYSAR ® Bromobutyl 2030
Chlorinated butyl rubber—commercial product sold as POLYSAR ®. Chlorobutyl 1240
α-Methylstyrene homopolymer—commercial product sold as AMOCO ® Resin 18-210 (softening point=210° F.), AMOC ® Resin 18-240 (softening point=240° F., AMOCO ® Resin 18-290 (softening point=290° F.)
Pentalyn "A"—tackifier—pentaerythritol ester of rosin
Carbon black—commercial product N-660 type
Paraffinic Oil—commercial product sold as Sunpar 2280
MBTS (mercaptobenzothiazyl disulphide: accelerator), TMTD (tetramethylthiurarm disulphide: accelerator), sulphur (curative), stearic acid (activator and processing aid) and zinc oxide (vulcanization agent) were commercially available materials

EXAMPLE 1

Ten bromobutyl polymer compounds were prepared according to the general recipe shown in Table 1, in which the bromobutyl polymer is the same as that described above. The glass transition temperature of the α-methylstyrene homopolymer used in the recipe was measured according to ASTM D3418-82. Compounding was done by mixing in a Laboratory Banbury, Model "B" internal mixer. The starting temperature of the mixer was 40° C. and the mixing cycle was completed in four minutes. Compounding was completed by adding the remaining ingredients (sulphur and zinc oxide) on a two-roll rubbermill at 40° C. The compounded stock was formed into sheets and vulcanized for 30 minutes at 166° C.

Tensile strength, modulus at 100 percent and 300 percent elongation and ultimate elongation to break were determined according to ASTM D412-80. Hardness was determined using a Type A Shore durometer according to ASTM D2240-81. Hot air aging was completed according to ASTM D573-81. Mill shrinkage of the compounded rubber compositions was determined according to ASTM D1917-84.

The air impermeability of the vulcanizates was determined according to the following procedure. A vulcanized rubber sheet was placed into a permeability test cell at which point a positive gas pressure of 50 psi was applied to one side of the sheet. The test cell was then preconditioned for 24 hours at room temperature to allow the system to establish an equilibrium prior to actual testing, after which the test cell was mounted in a constant temperature bath at 65° C. The gas permeating the specimen displaced a liquid from a graduated capillary tube, permitting a direct measurement of the volume. Accordingly, the reported value for air impermeability represents the volume of air passing, per second, through a specimen of 1 cm² area and 1 cm thickness when the difference in pressure across the specimen is one atmosphere.

TABLE I

| | Parts by weight |
|---|---|
| Rubbery polymer | 100 |

TABLE I-continued

| | Parts by weight |
|---|---|
| α-methylstyrene homopolymer | as specified |
| Carbon black | 60 |
| Stearic acid | 1 |
| Tackifier | 4 |
| MBTS | 1.3 |
| Zinc Oxide | 3 |
| Sulphur | 0.5 |

Static peel adhesion of the vulcanizates was tested using a modified version of the Pirelli Peel Test. In this procedure, a small slab of the rubber compound to be tested is placed in face to face contact with a similar slab of a control rubber compound, with a small teflon interface. Fabric layers are placed on both remote surfaces, and the assembly is cured, by heating for 30 minutes at 166° C. Then the force per unit-width required to pull the components apart at their mutual interface is measured at 100° C. and reported, in kiloNewtons per meter. When the adhesion is high, the separation sometimes occurs by tearing within the body of the rubber slabs under test. This is referred to as "stock tear", and represents a maximum value for the adhesion. In the present case, the control rubber compound against which the test compounds were cured was a natural rubber compound, representative of truck tire carcass compounds.

The actual compounds used and the test results on the vulcanizates are provided in Table II. Sample 1 in Table II is a control formulation containing 7 parts by weight per 100 parts by weight rubber of hydrocarbon extender oil in place of the α-methylstyrene homopolymer resin. The test results indicate that loadings of α-methylstyrene homopolymer, up to 15 parts by weight, result in marked improvements in air impermeability and marked reductions in mill shrinkage. The other test results indicate that vulcanizates derived from the rubber compositions of this invention possess the necessary balance of physical properties which renders them useful as a replacement for the control formulation.

TABLE II

| | Sample # | | | | | | | | | |
|---|---|---|---|---|---|---|---|---|---|---|
| | 1 | 2 | 3 | 4 | 5 | 6 | 7 | 8 | 9 | 10 |
| Glass transition temperature of resin, °C. | — | 21 | 21 | 21 | 56 | 56 | 56 | 70 | 70 | 70 |
| Amount of resin added, phr | — | 5 | 10 | 15 | 5 | 10 | 15 | 5 | 10 | 15 |
| COMPOUND PROPERTY | | | | | | | | | | |
| Compound Mooney (ML 1 + 4 at 100° C.) | 57 | 69 | 67 | 65 | 66 | 68 | 67 | 69 | 70 | 70 |
| Mill Shrinkage, % | 19 | 14 | 14 | 12 | 17 | 15 | 13 | 16 | 14 | 11 |
| VULCANIZATE PROPERTY | | | | | | | | | | |
| Hardness, Shore A | 52 | 63 | 66 | 66 | 68 | 69 | 70 | 65 | 66 | 68 |
| 100% Modulus, MPa | 1.2 | 1.5 | 1.4 | 1.4 | 1.7 | 1.6 | 1.6 | 1.6 | 1.7 | 1.7 |
| 300% Modulus, MPa | 4.3 | 4.9 | 4.1 | 3.7 | 5.0 | 4.6 | 4.0 | 5.1 | 4.8 | 4.5 |
| Tensile Strength, MPa | 10.3 | 9.5 | 8.8 | 8.2 | 9.5 | 9.2 | 8.3 | 9.9 | 9.4 | 8.7 |
| Elongation, % | 740 | 700 | 730 | 745 | 690 | 730 | 740 | 690 | 710 | 675 |
| AGED PROPERTY (168 hrs at 120° C.) | | | | | | | | | | |
| Hardness, Shore A | 66 | 72 | 75 | 76 | 72 | 75 | 75 | 72 | 73 | 75 |
| 100% Modulus, MPa | 2.5 | 3.1 | 3.0 | 3.2 | 3.1 | 3.1 | 3.0 | 3.2 | 3.2 | 3.2 |
| 300% Modulus, MPa | 7.1 | 7.7 | 6.8 | 6.6 | 7.5 | 7.0 | 6.5 | 7.8 | 7.2 | 6.8 |
| Tensile Strength, MPa | 9.4 | 8.8 | 7.9 | 7.7 | 8.3 | 7.7 | 7.2 | 8.5 | 8.0 | 7.5 |
| Elongation, % | 520 | 470 | 460 | 460 | 400 | 400 | 400 | 410 | 400 | 390 |
| Permeability to air (preconditioned 24 hrs at room temp. and 50 psi) at 65° C., $\times 10^{-8}$ | 3.2 | 2.5 | 2.5 | 2.3 | 2.4 | 2.4 | 2.3 | 2.3 | 2.0 | 1.9 |
| Static Peel Adhesion (to 100% natural rubber carcass) at 100° C., kN/m | 11.3 | 19.6 | 20.8 | 18.1 | 11.0 | 11.0 | 11.0 | 10.3 | 18.8 | 20.3 |

EXAMPLE 2

Using the compounding procedure described in Example 1, ten chlorobutyl polymer compounds were prepared according to the general recipe shown in Table I, in which the chlorobutyl polymer is the same as that described above.

The resulting vulcanizates were tested for tensile properties, hardness, air permeability, static peel adhesion and cut growth properties as described previously. The actual compounds used and the results of these tests are provided in Table III. Sample 11 in Table III is a control formulation containing 7 parts by weight per 100 parts by weight rubber of hydrocarbon extender oil in place of the α-methylstyrene homopolymer. These test results indicate that along with an improvement in air impermeability and static peel adhesion there also exists a desirable balance of other physical properties.

TABLE III

| | Sample # | | | | | | | | | |
|---|---|---|---|---|---|---|---|---|---|---|
| | 11 | 12 | 13 | 14 | 15 | 16 | 17 | 18 | 19 | 20 |
| Glass transition temperature of resin, °C. | — | 21 | 21 | 21 | 56 | 56 | 56 | 70 | 70 | 70 |
| Amount of resin added, phr | — | 5 | 10 | 15 | 5 | 10 | 15 | 5 | 10 | 15 |
| COMPOUND PROPERTY | | | | | | | | | | |
| Compound Mooney (ML 1 + 4 at 100° C.) | 59 | 68 | 73 | 66 | 74 | 73 | 72 | 75 | 74 | 77 |
| Mill Shrinkage, % | 23 | 15 | 15 | 15 | 19 | 17 | 17 | 14 | 14 | 12 |
| VULCANIZATE PROPERTY | | | | | | | | | | |

TABLE III-continued

| | Sample # | | | | | | | | | |
|---|---|---|---|---|---|---|---|---|---|---|
| | 11 | 12 | 13 | 14 | 15 | 16 | 17 | 18 | 19 | 20 |
| Hardness, Shore A | 56 | 61 | 63 | 61 | 60 | 65 | 65 | 61 | 63 | 63 |
| 100% Modulus, MPa | 1.4 | 1.4 | 1.3 | 1.3 | 1.7 | 1.6 | 1.5 | 1.5 | 1.5 | 1.5 |
| 300% Modulus, MPa | 5.2 | 4.7 | 4.3 | 4.1 | 5.8 | 5.1 | 4.7 | 5.1 | 4.7 | 4.5 |
| Tensile Strength, MPa | 10.1 | 9.8 | 9.3 | 8.8 | 9.6 | 9.2 | 8.5 | 10.4 | 9.6 | 9.0 |
| Elongation, % | 650 | 700 | 705 | 700 | 630 | 620 | 680 | 680 | 710 | 680 |
| AGED PROPERTY (168 hrs at 120° C.) | | | | | | | | | | |
| Hardness, Shore A | 62 | 67 | 67 | 68 | 67 | 66 | 70 | 68 | 69 | 71 |
| 100% Modulus, MPa | 1.9 | 2.7 | 2.6 | 2.6 | 2.3 | 2.2 | 2.3 | 2.6 | 2.7 | 2.8 |
| 300% Modulus, MPa | 6.7 | 8.4 | 7.5 | 7.6 | 7.4 | 6.6 | 6.3 | 8.3 | 7.9 | 7.3 |
| Tensile Strength, MPa | 10.5 | 10.1 | 9.1 | 9.2 | 10.1 | 9.9 | 8.9 | 10.6 | 9.9 | 8.8 |
| Elongation, % | 550 | 420 | 390 | 420 | 500 | 520 | 520 | 420 | 420 | 410 |
| Permeability to air (preconditioned 24 hrs at room temp. and 50 psi) at 65° C., $\times 10^{-8}$ | 2.9 | 2.2 | 2.1 | 2.2 | 2.0 | 2.0 | 2.0 | 2.4 | 2.4 | 2.0 |
| Static Peel Adhesion (to 100% natural rubber carcass) at 100° C., kN/m | 1.0 | 1.2 | 1.3 | 1.3 | 1.2 | 1.2 | 1.4 | 1.2 | 1.2 | 1.8 |

EXAMPLE 3

Using the compounding procedure described in Example 1, four bromobutyl polymer compounds were prepared according to the general recipe shown in Table IV, in which the bromobutyl polymer is the same as that described above.

The resulting vulcanizates were tested for tensile properties, hardness, air permeability and static peel adhesion as described previously. The results of these tests are provided in Table V. These test results indicate that when hydrocarbon extender oil is deleted from the recipe, the resulting compounds exhibit a reduction in mill shrinkage while the corresponding vulcanizates exhibit an improvement in both air impermeability and static peel adhesion.

TABLE IV

| | Parts by weight |
|---|---|
| Bromobutyl polymer | 100 |
| α-Methylstyrene homopolymer (Tg = 70° C.) | 15 |
| Carbon black | 60 |
| Oil | as specified |
| Stearic acid | 1 |
| Tackifier | 4 |
| MBTS | 1.3 |
| Zinc oxide | 3 |
| Sulphur | 0.5 |

TABLE V

| | Sample # | | | |
|---|---|---|---|---|
| | 21 | 22 | 23 | 24 |
| Amount of oil added, pbw | 7 | 4 | 2 | 0 |
| COMPOUND PROPERTY | | | | |
| Compound Mooney (ML 1 + 4 at 100° C.) | 56 | 62 | 66 | 72 |
| Mill Shrinkage, % | 19 | 19 | 17 | 16 |
| VULCANIZATE PROPERTY | | | | |
| Hardness, Shore A | 63 | 63 | 66 | 70 |
| 100% Modulus, MPa | 1.4 | 1.5 | 1.5 | 1.6 |
| 300% Modulus, MPa | 3.6 | 3.8 | 4.1 | 4.5 |
| Tensile Strength, MPa | 8.6 | 8.6 | 8.6 | 8.9 |
| Elongation, % | 755 | 725 | 710 | 695 |
| AGED PROPERTY (168 hrs at 120° C.) | | | | |
| Hardness, Shore A | 68 | 73 | 73 | 75 |
| 100% Modulus, MPa | 2.9 | 3.2 | 3.1 | 3.5 |
| 300% Modulus, MPa | 6.0 | 6.5 | 6.8 | 7.1 |
| Tensile Strength, MPa | 6.9 | 7.2 | 7.4 | 7.4 |
| Elongation, % | 420 | 410 | 390 | 350 |
| Permeability to air (preconditioned 24 hrs at room temp. and 50 psi) at 65° C., $\times 10^{-8}$ | 3.2 | 2.3 | 2.5 | 2.2 |
| Static Peel Adhesion (to 100% natural rubber carcass) at 100° C., kN/m | 15.2 | 15.7 | 15.0 | 16.7 |

EXAMPLE 4

Using the compounding procedure described in Example 1, three bromobutyl polymer compounds were prepared according to the recipes shown in Table VI, in which the bromobutyl polymer is the same as that described above. Samples 26 and 27 in the above mentioned Table contained a mixture of bromobutyl polymer and α-methylstyrene homopolymer that was solution blended (100 parts by weight bromobutyl polymer plus 15 parts by weight α-methylstyrene homopolymer) prior to compounding.

The resulting vulcanizates were tested for tensile properties, hardness, air permeability and static peel adhesion as described previously, and also for tear strength according to ASTM D624-81 and for fatigue life using the Monsanto "fatigue to failure" (FTF) test. In this test, dumbbell shaped pieces of cured rubber, of standard size, are gripped by their ends in the jaws of a test machine, and repeatedly stretched and relaxed. The number of stretching cycles to breaking of the samples is recorded, and averaged over twelve test samples. In this case, the samples were repeatedly stretched to 140 percent extension by the use of cam #24. The results of these tests are provided in Table VII. Sample 25 in Table VII is a control formulation. These test results indicate that when bromobutyl polymer and α-methylstyrene homopolymer are solution blended prior to compounding, an improvement in air impermeability and static peel adhesion is observed over the control formulation.

TABLE VI

| | 25 | 26 | 27 |
|---|---|---|---|
| Bromobutyl polymer | 100 | — | — |
| Bromobutyl polymer/ | — | 115 | 115 |

TABLE VI-continued

|  | 25 | 26 | 27 |
|---|---|---|---|
| α-methylstyrene homopolymer solution blend |  |  |  |
| Carbon black | 60 | 60 | 60 |
| Oil | 7 | 2 | — |
| Stearic acid | 1 | 1 | 1 |
| MBTS | 1.3 | 1.3 | 1.3 |
| Tackifier | 4 | 4 | 4 |
| Zinc oxide | 3 | 3 | 3 |
| Sulphur | 0.5 | 0.5 | 0.5 |

TABLE VII

|  | SAMPLE # | | |
|---|---|---|---|
|  | 25 | 26 | 27 |
| COMPOUND PROPERTY |  |  |  |
| Compound Mooney (ML 1 + 4 at 100° C.) | 59 | 68 | 69 |
| Scorch at 135° C. (5 pt rise), min. | 12.8 | 12.0 | 9.2 |
| VULCANIZATE PROPERTY |  |  |  |
| Hardness, Shore A | 60 | 66 | 67 |
| 100% Modulus, MPa | 1.1 | 1.4 | 1.4 |
| 300% Modulus, MPa | 4.0 | 3.6 | 3.6 |
| Tensile strength, MPa | 8.9 | 6.9 | 6.5 |
| Elongation, % | 680 | 700 | 640 |
| AGED PROPERTIES (168 hrs at 120° C.) |  |  |  |
| Hardness, Shore A | 67 | 75 | 76 |
| 100% Modulus, MPa | 2.3 | 2.8 | 2.9 |
| 300% Modulus, MPa | 6.6 | 6.0 | 6.8 |
| Tensile strength, MPa | 8.9 | 6.2 | 7.0 |
| Elongation, % | 510 | 340 | 350 |
| Static Peel Adhesion (to 100% natural rubber carcass) at 100° C., kN/m | 10.8 | 14.7 | 15.7 |
| Monsanto Flex to Failure (Cam #24) |  |  |  |
| unaged, kc | 179 | 283 | 449 |
| aged (168 hrs at 120° C.) kc | 27 | 12 | 14 |
| Tear strength |  |  |  |
| at room temp., kN/m | 40 | 30.9 | 30.4 |
| at 100° C., kN/m | 36.3 | 31 | 27.9 |
| Permeability to air (preconditioned 24 hrs at room temp. and 50 psi) at 65° C., × 10⁻⁸ | 3.2 | 2.0 | 2.0 |

EXAMPLE 5

Using the compounding procedure described in Example 1, four butyl polymer compounds were prepared according to the general recipe shown in Table VIII, in which the butyl polymer is the same as that described above.

The resulting vulcanizates were tested for tensile properties, hardness, air permeability and static peel adhesion properties as described previously. The results of these tests are provided in Table IX. Sample 28 in Table IX is a control formulation containing 7 parts by weight per 100 parts by weight rubber of hydrocarbon extender oil in place of the α-methylstyrene homopolymer. These test results indicate that along with an improvement in air impermeability, there also exists a desirable balance of other physical properties.

TABLE VIII

|  | Parts by weight |
|---|---|
| Butyl polymer | 100 |
| α-Methylstyrene homopolymer (Tg = 70° C.) | as specified |
| Carbon black | 60 |
| Stearic acid | 1 |
| Tackifier | 4 |
| MBTS | 1.3 |
| Zinc oxide | 4 |
| Sulphur | 1.5 |
| TMTD | 1 |

TABLE IX

|  | SAMPLE # | | | |
|---|---|---|---|---|
|  | 28 | 29 | 30 | 31 |
| Amount of resin added, phr | — | 5 | 10 | 15 |
| COMPOUND PROPERTY |  |  |  |  |
| Compound Mooney (ML 1 + 4 at 100° C.) | 72 | 89 | 87 | 83 |
| Mill Shrinkage, % | 21 | 17 | 17 | 17 |
| VULCANIZATE PROPERTY |  |  |  |  |
| Hardness, Shore A | 62 | 72 | 70 | 70 |
| 100% Modulus, MPa | 2.0 | 2.6 | 2.6 | 2.7 |
| 300% Modulus, MPa | 5.5 | 6.2 | 6.1 | 4.8 |
| Tensile Strength, MPa | 12.2 | 10.1 | 10.6 | 8.6 |
| Elongation, % | 620 | 580 | 600 | 640 |
| AGED PROPERTIES (168 hrs at 120° C.) |  |  |  |  |
| Hardness, Shore A | 63 | 72 | 72 | 80 |
| 100% Modulus, MPa | 1.4 | 1.8 | 1.8 | 1.8 |
| 300% Modulus, MPa | 3.9 | 4.3 | 4.3 | 3.6 |
| Tensile Strength, MPa | 8.4 | 6.8 | 6.5 | 5.0 |
| Elongation, % | 705 | 605 | 510 | 550 |
| Permeability to air (preconditioned 24 hrs at room temp. and 50 psi) at 65° C., × 10⁻⁸ | 3.7 | 2.5 | 2.5 | 2.4 |
| Static Peel Adhesion (to 100% natural rubber carcass) at 100° C., kN/m | 0.01 | 0.01 | 0.01 | 0.02 |

What is claimed is:

1. A new rubber composition, the vulcanizate of which has reduced permeability to gases, comprising:
   one hundred parts by weight of at least one rubbery polymer selected from the group consisting of butyl rubber, chlorinated butyl rubber and brominated butyl rubber,
   from about 3 to about 20 parts by weight of α-methylstyrene homopolymer having a softening point of from about 93° C. to about 150° C. and a Tg of from about 15° C. to about 75° C.,
   from about 30 to about 90 parts by weight of at least one carbon black,
   from 0 to about 7 parts by weight of hydrocarbon extender oil, and
   a curing system.

2. The composition of claim 1, wherein the amount of α-methylstyrene homopolymer is from about 12 to about 18 parts by weight.

3. The composition of claim 2, wherein the amount of carbon black is from about 50 to about 70 parts by weight.

4. The composition of claim 3, wherein said curing system comprises from about 1 to about 10 parts by weight of zinc oxide, from about 0.2 to about 2 parts by weight of elemental sulphur and from about 0.5 to about 3 parts by weight of at least one sulphur based accelerator.

5. The composition of claim 4, wherein the amount of said zinc oxide is from about 2 to about 5 parts by weight.

6. The composition of claim 5, wherein the hydrocarbon extender oil is paraffinic.

7. The composition of claim 6, wherein the amount of hydrocarbon extender oil is from 0 to about 4 parts by weight.

8. The composition of claim 7, wherein the halogenated butyl rubber is chlorinated butyl rubber.

9. The composition of claim 7, wherein the halogenated butyl rubber is brominated butyl rubber.

10. Vulcanizates of the composition of claim 8.

11. Vulcanizates of the composition of claim 9.

12. A pneumatic tire having an inner liner comprising the vulcanizate of claim 10.

13. A pneumatic tire having an inner liner comprising the vulcanizate of claim 11.

14. A membrane material comprising the vulcanizate of claim 10.

15. A membrane material comprising the vulcanizate of claim 11.

16. The composition of claim 7, wherein the α-methylstyrene homopolymer has a softening point of from about 130° to about 150° C. and a Tg of from about 65° C. to about 75° C., further characterized in that no hydrocarbon extender oil is used.

17. The composition of claim 16, wherein the halogenated butyl rubber is brominated butyl rubber.

18. Vulcanizates of the composition of claim 17.

19. A pneumatic tire having an inner liner containing the vulcanizate of claim 18.

20. A process for producing a vulcanizate having reduced permeability to gases which comprises:
   (A) mixing one hundred parts by weight of at least one rubbery polymer selected from the group consisting of butyl rubber, chlorinated butyl rubber and brominated butyl rubber with an α-methylstyrene homopolymer, wherein said α-methylstyrene homopolymer is used in an amount of from about 3 to about 20 parts by weight and has a softening point of from about 93° C. to about 150° C. and a Tg of from about 15° C. to about 75° C., from about 30 to about 90 parts by weight of at least one carbon black, from 0 to about 7 parts by weight of hydrocarbon extender oil, and a curing system,
   (B) forming the mixture produced in (A) into a sheet, and
   (C) vulcanizing the sheet formed in (B) at a temperature of from about 150° C. for from about 5 to about 60 minutes.

21. The process of claim 20, wherein the amount of α-methylstyrene homopolymer is from about 12 to about 18 parts by weight.

22. The process of claim 21, wherein the rubbery polymer is brominated butyl rubber.

23. The process of claim 22, wherein the α-methylstyrene homopolymer has a softening point of from about 110° C. to about 150° C. and a Tg of from about 50° C. to about 75° C.

24. The process of claim 22, wherein the α-methylstyrene homopolymer has a softening point of from about 130° C. to about 150° C. and a Tg of from about 65° C. to about 75° C.

* * * * *

UNITED STATES PATENT AND TRADEMARK OFFICE
CERTIFICATE OF CORRECTION

PATENT NO. : 4,754,793

DATED : July 5, 1988

INVENTOR(S) : Sheikh A.H. MOHAMMED

It is certified that error appears in the above-identified patent and that said Letters Patent is hereby corrected as shown below:

Column 14, line 13, after "150°C" insert --to about 200°C--.

Signed and Sealed this

Seventh Day of February, 1989

Attest:

DONALD J. QUIGG

Attesting Officer

Commissioner of Patents and Trademarks